INVENTOR
WILLIAM R. POSTLEWAITE
BY
ATTORNEYS

INVENTOR
WILLIAM R. POSTLEWAITE
BY
ATTORNEYS

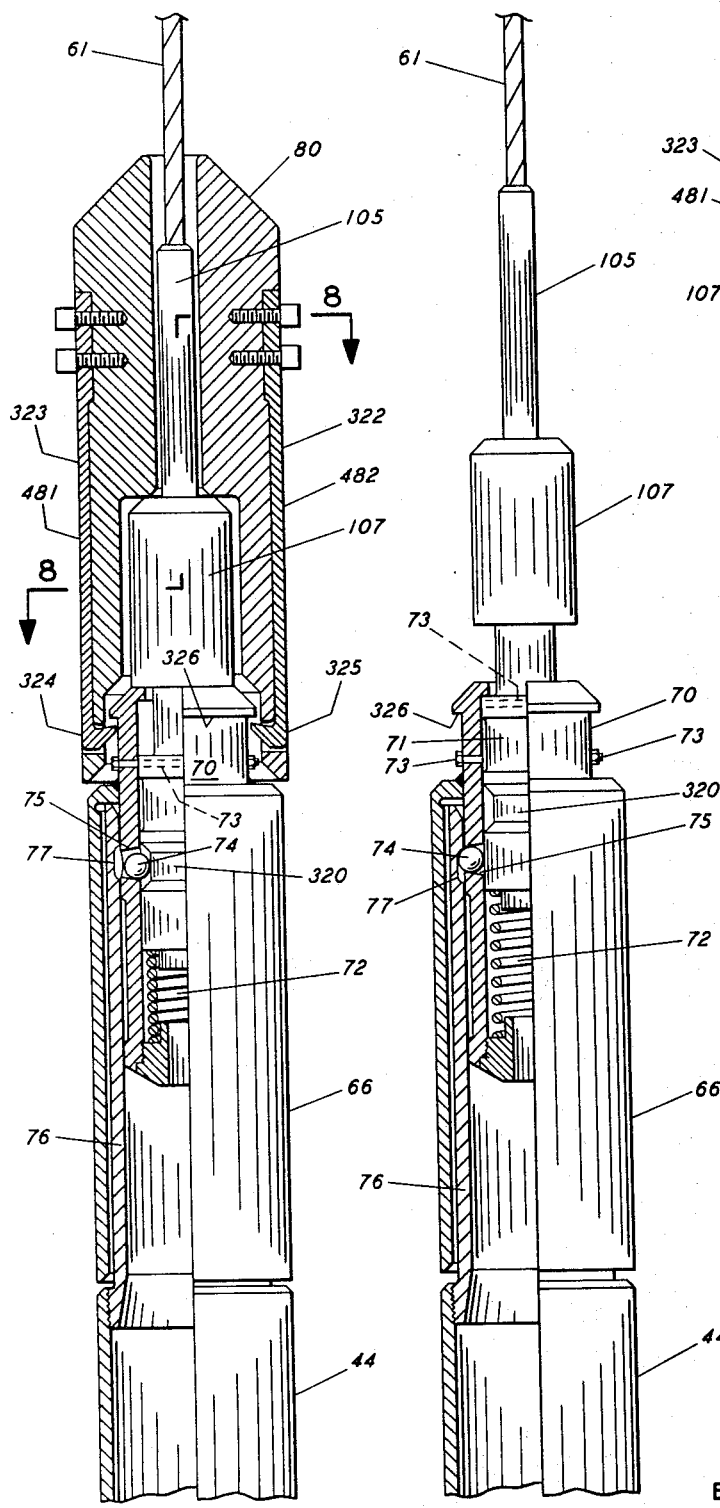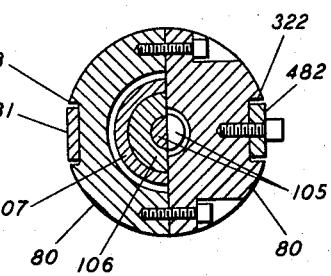

United States Patent Office 3,358,752
Patented Dec. 19, 1967

3,358,752
DETACHABLE COUPLING APPARATUS FOR ATTACHING AND DETACHING A GUIDE CABLE TO AN UNDERWATER WELL BASE
William R. Postlewaite, Menlo Park, Calif., assignor to Chevron Research Company, San Francisco, Calif., a corporation of Delaware
Filed Oct. 23, 1965, Ser. No. 503,852
3 Claims. (Cl. 166—.5)

ABSTRACT OF THE DISCLOSURE

The invention provides a coupling member for use in connecting a guide line to an underwater guide post. The coupling member includes means movable for engaging and disengaging a groove on the guide post to disconnectably connect the coupling member and a guide line rotatably connected thereto to the guide post.

This application is a continuation-in-part application of application Ser. No. 235,215 filed Nov. 5, 1962 now U.S. Patent 3,302,709 issued July 7, 1967.

This invention relates to apparatus useful in underwater drilling and producing applications; and, more particularly, it relates to apparatus for disconnectably connecting a flexible guide line or the like to an underwater post.

It is a broad aspect of the invention to provide apparatus for disconnectably connecting a flexible guide line or cable to a guide post of a subsea well. A coupling member is connected to a guide line. A well post is provided with an annular groove. The coupling member has means cooperating with the groove to connect the member to the well post. The cooperating means can be later actuated from a remote location to permit the coupling member to be disconnected from the post.

Summary

The invention relates to apparatus for use in offshore oil production to disconnectably connect a flexible guide line or cable to a guide post of a subsea well. A coupling member is rotatably connected to a guide line. The coupling member has connecting means cooperating with a groove on the guide post to disconnectably connect the coupling member to the guide post. The coupling member can be disconnected from the guide post by a striking bar member having latch means for disconnecting the coupling member.

It is a particular object of this invention to provide apparatus for attaching and detaching a guide line to a guide post located at an underwater well site, said attaching and detaching being accomplished from a surface location without the use of divers.

Further objects and advantages of the present invention will become apparent from the following detailed description read in light of the accompanying drawings which are a part of this specification and in which:

FIG. 6 is an elevational view partially in section illustrating the coupling member of FIG. 4 disconnectably connecting a flexible line and a post;

FIG. 7 is an elevational view partially in section illustrating a means for disconnecting the coupling member and the flexible line attached thereto from the post; and FIG. 8 is Section 8—8 of FIG. 7.

Figure 1:
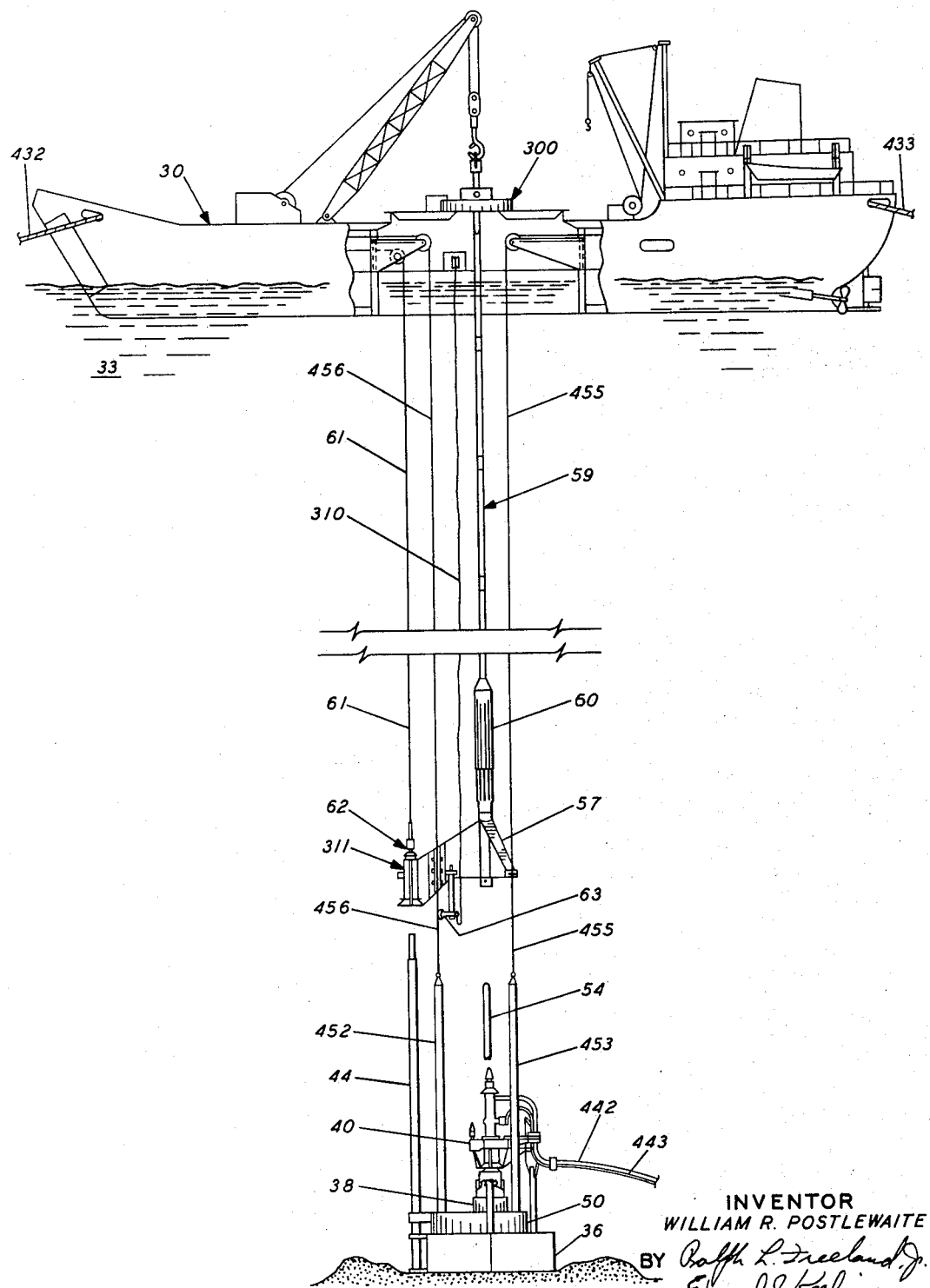
FIG. 1 illustrates, in side elevation with parts broken away for clarity of presentation, apparatus useful in understanding this invention.
Figure 5:
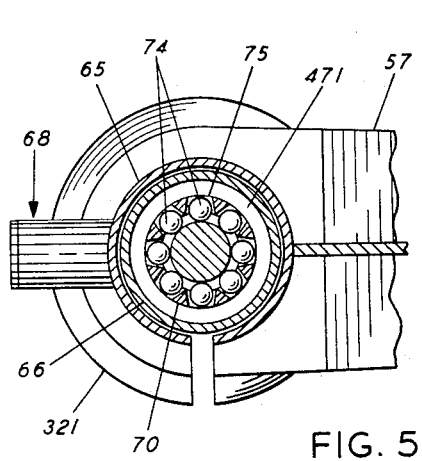
FIG. 5 is Section 5—5 of FIG. 4.

The description of the apparatus of FIG. 1 is useful in understanding the present invention. Referring now to the drawings and particularly to FIG. 1, there is illustrated an offshore drilling vessel, generally designated by the numeral 30, which has been anchored by lines 432 and 433 over a body of water 33 in approximate vertical relationship over the site where a well has been drilled in the underwater bottom 34. The drilling vessel 30 has an operational base which is generally indicated by numeral 300.

The operational base 300 of the vessel 30 is suitably maintained to run drill pipe and handle cables and to perform the other functions that are well known in the underwater drilling art. A permanent base 36 is located at a subsea well site and forms part of the fixed well site control apparatus. The permanent base has been secured to the well casing (not shown) which is cemented in the well bore. The upper end of the casing terminates in a fitting 38 which projects above the permanent base 36 and to which the wellhead control apparatus 40 is secured. Production lines 442 and control lines 443 are coupled to the well control apparatus 40 and extend to any suitable location. It has been assumed for ease in describing the present invention that the well has been drilled and completed to a stage where it has the wellhead control apparatus in place and is ready to or has been produced. The invention, however, is not limited to use in a well completed to this stage. For the purpose of this invention, it is only necessary that a post be positioned at a subsea location and that it be desirable to disconnectably connect a guide cable or the like to the post.

A post 44 is fixedly connected to permanent base 36 by a suitable means. A working base 50, including at least a pair of guide posts 452 and 453 fixedly mounted thereon, is connected to the permanent base 36. The guide posts 452 and 453 and the flexible guide lines 455 and 456 associated therewith extend between the working base 50 at the subsea well site and the operational base 300 of the drilling vessel 30. Means for taking up and letting out the flexible guide lines are provided on the operational base 300. A secondary pilot post element 54 is connected to permanent base 36 to aid in aligning the working base 50 when it is moved into position over permanent base 36.

The preferred embodiment of this invention will be described in detail with regard to disconnectably connecting flexible line 61 to post 44 of base 36 of FIG. 1. It is noted, however, that the present invention is not limited to any particular number or arrangement of guide posts and associated guide lines. Any arrangement of guide posts and guide lines deemed operationally desirable may be disconnectably connected in accordance with this invention.

In accordance with one form of the invention, the coupling member is useful to disconnectably connect a pilot line 61 to a pilot post 44 located underwater. For example, a guide arm member 57 is connected to a drill string 59 by a suitable connecting member, such as a bumper sub 60. The drill string 59 serves to move the guide arm member 57 slidably along the guide lines 455 and 456 between the drilling vessel 30 and the working base 50. The guide arm member 57 releasably holds a flexible pilot line 61 and coupling member 62 by means of friction sleeve 311. The guide arm member 57, acting in cooperation with the guide lines 455 and 456, guides the coupling member 62 to pilot post 44. The guide arm member 57 also carries television camera 63 and suitable lighting equipment for underwater observation. A cable 310 provides for electrical contact between the television camera 63 and associated equipment and the operational base 300 of the floating vessel 30.

The position of the apparatus as illustrated in FIG. 1 might occur after the completion of some work at the well site; for example, opening or closing a valve on wellhead control apparatus 40. After this operation has been completed and it is desired to disconnect the working base 50 from the well, the pilot line 61 is guided to the pilot post 44 where it is disconnectably connected to the pilot post 44 by coupling member 62. After the flexible pilot line 61 is connected to the pilot post 44, the working base 50 may be disconnected from the permanent base 36 and the working base 50, including the guide posts 452 and 453 and the flexible guide lines 455 and 456 connected thereto, can be removed from the permanent base 36 and, if desired, taken from the water to vessel 30. The flexible pilot line 61 is then the only connection between permanent base 36 and the operational base 300 of vessel 30. The flexible pilot line 61 is connected to a float or buoy and released from the vessel 30 to mark the location of the underwater well and to provide a flexible connecting element extending therefrom.

Figure 3:
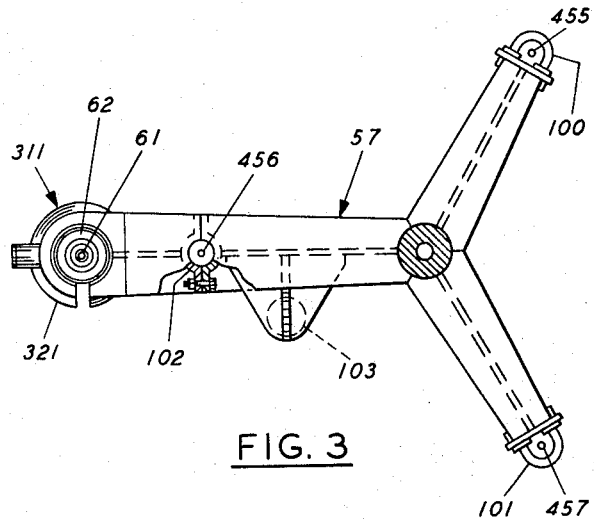
FIG. 3 is Section 3—3 of FIG. 2.
Figure 2:
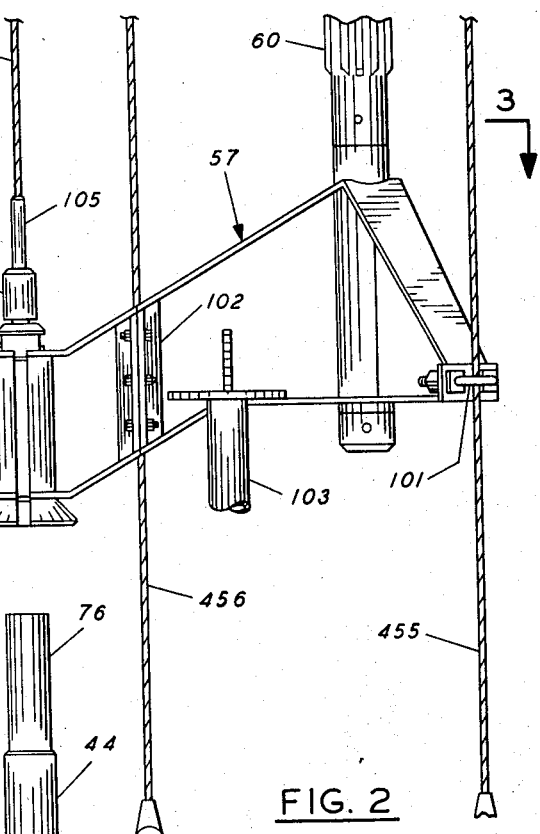
FIG. 2 illustrates, in side elevation, an enlarged view of a portion of the apparatus illustrated in FIG. 1 and better shows a preferred form of apparatus for disconnectably connecting a flexible line to an underwater post.

In FIG. 2 an enlarged view of a portion of the apparatus illustrated in FIG. 1 is shown. Guide arm member 57 is slidably mounted on flexible guide lines 455, 456 and 457 by suitable means, such as U-bolts 100 and 101 and sleeve 102. A bracket 103 for the television camera and lights is also connected to the guide arm member 57. A cable 310 provides contact between the surface and the television camera and lights. The guide arm member 57 releasably secures coupling 62 and the attached flexible pilot element 61 by means of friction sleeve 311. Friction sleeve 311 is prepositioned on the guide arm member 57 to cause the coupling member 62 to contact the pilot post 44 as the guide arm member 57 is lowered along the guide lines 455, 456 and 457. The operation and use of guide arms and guide lines are well known to those skilled in the art and need not be exhaustively described herein. FIG. 3, which is Section 3—3 of FIG. 2, clearly shows the interaction between the guide arm member 57, guide lines 455, 456 and 457 and the bumper sub 60 which serves to connect the drill string and the guide arm member.

Figure 4:
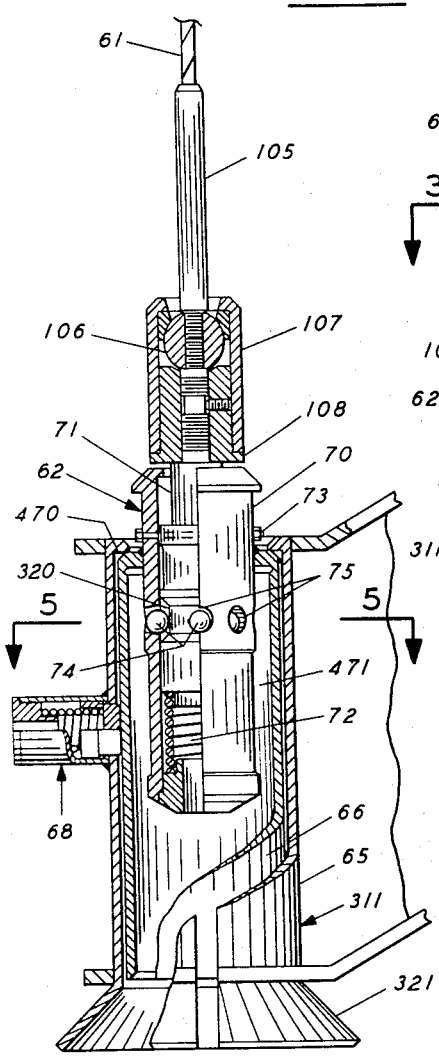
FIG. 4 is a side elevation partially in section illustrating a preferred coupling member for disconnectably connecting the flexible line to an underwater post.

In FIGS. 4, 5, 6, 7 and 8, the preferred embodiment of apparatus for disconnectably connecting the pilot line 61 to the pilot post 44 is illustrated. FIG. 4 is a side elevation partially in section of a coupling member 62 held in friction sleeve 311. Coupling member 62 is useful to disconnectably connect the pilot line 61 to the pilot post 44. The pilot line—which may be, for example, wire cable—is rotatively connected to coupling member 62. The pilot line 61 is fixedly secured in fitting 105. A ball 106 is connected to the other end of fitting 105. A ball and socket joint is provided for ball 106 by a socket formed by cooperation between female member 107 and male member 108. Male member 108 is fixedly attached to a movable member 71 of the coupling member 62.

The guide arm member 57 holds coupling member 62 in a releasable manner. For example, a friction sleeve, indicated generally as 311, is fixedly attached to guide arm member 57 and is positioned slidably over the tubular member 66 of coupling 62. The cylindrical body 65 of friction sleeve 311 has a shoulder 470 which engages the upper portion of the tubular member 66 to prevent the tubular member 66 from sliding through the friction sleeve 311 as it is lowered into the water. A spring loaded piston 68 forces tubular member 66 against the interior of the cylindrical body 65 of the friction sleeve 311 to give a frictional contact between the members to maintain them in a normally contacting position. The friction sleeve 311 may, however, be slidably removed from coupling member 62 in an upwardly direction.

To further described the cooperation between coupling member 62 and pilot post 44 to disconnectably connect the pilot line 61 and the pilot post 44, particular reference is now made to FIG. 4 and FIG. 6. The operating chamber 70 of coupling member 62 is fixedly mounted on tubular body member 66 and a portion of the operating chamber 70 extends interiorly of the tubular body member 66. The outside dimension of the operating chamber 70 is sufficiently less than the inside dimension of tubular body member 66 so as to provide an annular space between the two as indicated by numeral 471. The annular space or annulus is adapted to receive the end 76 of the pilot post 44. A moveable member 71 is slidably positioned in the operating chamber 70 for limited reciprocating motion therein. A resilient means, such as spring 72, is positioned below the movable member 71 to urge it in an upwardly direction. Initially, the movable member 71 is forced down on the spring 72 and is releasably held in this position by shear pin 73 which extends through the movable member 71 and is secured to the operating chamber 70. The movable member 71 is provided with an annular groove 320. The groove 320 is provided with cammed walls and is deep enough to accommodate a number of spaced-apart means movable, such as balls 74, in a recessed position in the ports 75 in the walls of the operating chamber 70 as shown in FIG. 4. Thus, the movable member has two surfaces contactable with the balls 74. The first of the surfaces forces the balls to extend out of ports 75, as illustrated in FIG. 6. The second of the surfaces allows the balls to move into the ports 75 as illustrated in FIG. 7.

The coupling member 62 is positioned on the end 76 of the pilot post 44 by guide arm member 57 slidably moving on guide lines 455, 456 and 457 and by the use of the television camera 63 if necessary. The flared end 321 of friction sleeve 311 aids in engaging the end 76 of the pilot post 44. The end 76 of the pilot post 44 is slidably received into the annular chamber 471 between the tubular body member 66 and the operating chamber 70 of coupling member 62. When the coupling member 62 is thus seated on the pilot post 44, shear pin 73 is broken by suitable means, such as by simultaneously pulling up on pilot line 61 and holding down on guide arm member 57. The now freed movable member 71 moves upwardly and forces the balls 74 to extend out of ports 75.

With reference to FIG. 6, the end 76 of the pilot post 44 is provided with an annular extending groove 77 for receiving the extended balls 74. As the movable member 71 moves up in the operating chamber 70, the cammed wall of movable member 71 forces the balls 74 to extend out beyond the operating chamber through ports 75. Ports 75 are formed to allow a portion of the balls to extend through the ports 75 but not to allow the balls 74 to escape out of the operating chamber 70. The balls 74 are forced out and are received in the groove 77 formed in the interior of the end 76 of the pilot post 44 to thus provide a firm connection between coupling member 62 and pilot post 44. The friction sleeve 311, fixedly connected to guide arm member 57, is then slidably removed over coupling member 62 by pulling up guide arm member 57 along the guide lines 455, 456 and 457.

With reference now to FIG. 7, means for disconnecting coupling member 62 from pilot post 44 are illustrated. A striking bar 80 having a hollow interior adapted to slide along pilot line 61 and to strike the coupling member 62 in the position illustrated in FIG. 6 is dropped from the surface. FIG. 7 illustrates the interaction between the striking bar 80 and the coupling member 62 after the impact between the two has occurred. Striking bar 80 is provided with a plurality of springable latch members; for example, latch members 481 and 482 which normally are located in grooves 322 and 323 on the exterior surface of striking bar 80. The latch members 481 and 482 have fingers 324 and 325 for engaging a flange 326 on the operating chamber 70. When the striking bar strikes coupling member 62, the impact causes the movable member 71 of coupling member 62 to move forceably in a downwardly direction and to compress spring 72. The groove 320 in movable member 71 comes alongside balls 74, and the balls 74 can retreat into the groove 320. The fingers 324 and 325 of latch members 481 and 482 engage the flange 326 on the operating chamber 70, and the movable member 71 is held in the down position by weight 80. Since the balls 74 are recessed in groove 320, the coupling member 62 is disconnected and can be removed from the pilot post 44.

Although only a preferred embodiment of apparatus has been described in detail, the present invention is not to be limited to the apparatus so described but rather only by the scope of the appended claims.

I claim:

1. Apparatus for disconnectably connecting a guide line to an underwater well post comprising an underwater well post, an annularly extending groove in the upper portion of said post, a coupling member, said coupling member including means forming an operating chamber, means for rotatably connecting said coupling member to a guide line, port means in said means forming an operating chamber, means movable in said operating chamber of said coupling member for extending through said port means and into engagement with said annularly extending groove to disconnectably connect said coupling member and said post, a movable member in said operating chamber and in contact with said means movable, said movable member having at least two surfaces contactable with said means movable, the first of said surfaces being adapted to extend said means movable through said port means and into said annularly extending groove and the second of said surfaces allowing said means movable to retreat from said annularly extending groove and into said port means and resilient means normally urging said movable member into a position where the first of said surfaces contacts said means movable.

2. Apparatus for disconnectably connecting a guide line to an underwater well post comprising an underwater well post, an annularly extending groove in the upper portion of said post, a coupling member, said coupling member including means forming an operating chamber, means for connecting said coupling member to a guide line, port means in said means forming an operating chamber, means movable in said operating chamber of said coupling member for extending through said port means and into engagement with said annularly extending groove to disconnectably connect said coupling member and said post, a movable member in said operating chamber and in contact with said means movable, said movable member having at least two surfaces contactable with said means movable, the first of said surfaces being adapted to extend said means movable through said port means and into said annularly extending groove and the second of said surfaces allowing said means movable to retreat from said annularly extending groove and into said port means, resilient means normally urging said movable member into a position where the first of said surfaces contacts said means movable and a striking bar member for moving said movable member to a position where the second of said surfaces of said movable member is contactable with said means movable, the said striking bar member having latch means cooperating with said coupling member to retain said movable member in said position.

3. Apparatus for disconnectably connecting a guide line to an underwater well post comprising an underwater well post, an annularly extending groove in the upper portion of said post, a coupling member, said coupling member including means forming an operating chamber, means for connecting said coupling member to a guide line, port means in said means forming an operating chamber, means movable in said operating chamber of said coupling member for extending through said port means and into engagement with said annularly extending groove to disconnectably connect said coupling member and said post, a movable member in said operating chamber and in contact with said means movable, said movable member having at least two surfaces contactable with said means movable, the first of said surfaces being adapted to extend said means movable through said port means and into said annularly extending groove and the second of said surfaces allowing said means movable to retreat from said annularly extending groove and into said port means and resilient means normally urging said movable member into a position where the first of said surfaces contacts said means movable, said resilient means being located below the movable member to normally urge the movable member in an upward direction.

References Cited

UNITED STATES PATENTS

| | | | |
|---|---|---|---|
| 3,050,139 | 8/1962 | Hayes | 175—7 |
| 3,126,064 | 3/1964 | Miller | 175—257 X |
| 3,163,223 | 12/1964 | Bauer et al. | 166—.6 X |
| 3,163,228 | 12/1964 | Hayes | 166—.5 X |
| 3,225,845 | 12/1965 | Koontz | 175—236 |
| 3,232,346 | 1/1966 | Wakefield | 166—.6 |

CHARLES E. O'CONNELL, *Primary Examiner.*

R. E. FAVREAU, *Assistant Examiner.*